(12) United States Patent
Singhal et al.

(10) Patent No.: US 12,348,668 B2
(45) Date of Patent: Jul. 1, 2025

(54) SYSTEM AND METHOD FOR IDENTIFYING CALL STATUS IN REAL-TIME

(71) Applicant: EXOTEL TECHCOM PVT. LTD., Bengaluru (IN)

(72) Inventors: Sarthak Singhal, New Delhi (IN); Siddharth Ramesh, Bangalore (IN); Shivakumar Ganesan, Bengaluru (IN); Shiva Shankar Arumugam, Bengaluru (IN); Govindarajan M, Trichy (IN)

(73) Assignee: Exotel Techcom Pvt. Ltd. (IN)

( * ) Notice: Subject to any disclaimer, the term of this patent is extended or adjusted under 35 U.S.C. 154(b) by 621 days.

(21) Appl. No.: 17/233,447

(22) Filed: Apr. 17, 2021

(65) Prior Publication Data

US 2021/0329127 A1    Oct. 21, 2021

(51) Int. Cl.
*H04M 3/22* (2006.01)
*G06F 18/2411* (2023.01)
*G06N 20/00* (2019.01)
*H04M 3/436* (2006.01)

(52) U.S. Cl.
CPC ....... *H04M 3/2218* (2013.01); *G06F 18/2411* (2023.01); *G06N 20/00* (2019.01); *H04M 3/436* (2013.01)

(58) Field of Classification Search
CPC ..... H04M 3/2218; H04M 3/436; G06N 20/00
USPC ...................................................... 455/412
See application file for complete search history.

(56) References Cited

U.S. PATENT DOCUMENTS

| 9,538,009 | B1* | 1/2017 | Noble, Jr. | ............. | H04M 7/129 |
| 2004/0190691 | A1* | 9/2004 | Schoeman | ............ | H04M 1/656 |
| | | | | | 379/88.16 |

\* cited by examiner

Primary Examiner — Ahmad F. Matar
Assistant Examiner — Jirapon Tulop
(74) Attorney, Agent, or Firm — Grandhi Law Chambers; Krishna CV Grandhi (57) ABSTRACT

Exemplary embodiments of the present disclosure are directed towards a system and method for identifying call status in real-time, the system comprising a classifier module configured to analyze recorded audio files based on the pre-defined labelled set using signal processing audio classification and machine learning techniques on a first communication device, a second communication device, and a machine learning device. The classifier module splits the recorded audio files into chunks on the first communication device, the second communication device, and machine learning device in real-time. The classifier module extracts the audio features from audio files. The classifier module creates linear support vector classification model and trains linear support vector classification model using audio files. The classifier module removes invalid states from audio files and gives final state of call status reason and metadata by applying state machine rules on first communication device, second communication device, and machine learning device.

16 Claims, 4 Drawing Sheets

SYSTEM AND METHOD FOR IDENTIFYING CALL STATUS IN REAL-TIME

CROSS-REFERENCE TO RELATED APPLICATIONS

This patent application claims priority benefit of the Indian Provisional Patent Application No: 202041011449, entitled "SYSTEM AND METHOD FOR IDENTIFYING CALL STATUS IN REAL-TIME", with a priority date of 17 Apr. 2020, and of the Indian Non Provisional Patent Application No: 202041011449, entitled "SYSTEM AND METHOD FOR IDENTIFYING CALL STATUS IN REAL-TIME", with a priority date of 14 Apr. 2021. The entire contents of said patent applications are hereby incorporated by reference herein in their entirety.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

TECHNICAL FIELD

The disclosed subject matter relates generally to the field of telecommunications. More particularly, the present disclosure relates to a system and method for identifying call status in real-time using classification of audio messages.

BACKGROUND

A telephone call is one of most important means of communication in daily life and work. A caller needs to know the telephone number of a callee before making a telephone call. The caller may record telephone numbers of contacts into a communication list of an electronic device. A communication server may be operated and maintained by a communication service provider for supporting communication between a caller's device and a callee's device. A problem that communication service provider's face in the calling industry for both session initiation protocol (SIP) and public switched telephone network (PSTN) is to identify the correct call status where, the integrated services digital network (ISDN) caused codes or SIP codes returned from the communication service operator networks across the world majorly do not correlate with real world scenario. For example, to identify the call status i.e., whether a destination number is switched off or not reachable, the communication service operator networks are unable to return correct ISDN/SIP codes for actual calls. This is due to the user disconnecting the call while the operator message is played or when computation at the communication service operator network is incorrectly configured. Due to this limitation, the correct call status information is not available.

Existing communication devices face problems such as not being able to identify if the destination number's phone rang or not, for example, if the ringing event returned by the communication service operator network is not correct and there is no other means to know if the phone rang or not. The communication devices are also not able to give the correct reason for call failure in the majority of cases. The communication devices are not able to decide in which scenario the user should retry and in which scenario the user should not retry, for example, a user wants to retry the call when the end party number is not reachable but the user could not retry because the user is not getting the corresponding failure code from the communication service operator network. In another case, a food-delivery agent during delivery of a package can call the customer's number and if the customer is not reachable for multiple attempts, the delivery agent can cancel the order. When ISDN cause code or SIP code from the communication service operator network is not correct, the delivery agent might end up cancelling the order unnecessarily. Since ISDN cause code is not right, the delivery agent also can falsely cancel the order without attempting the delivery and claiming that end user is not reachable by making a call to the end user and disconnecting immediately. If the correct call status information was available, the delivery agent will not be unable to make such fake attempts.

In the light of the aforementioned discussion, there exists a need for a system with novel methodologies that would overcome the above-mentioned challenges.

SUMMARY

The following presents a simplified summary of the disclosure in order to provide a basic understanding of the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Exemplary embodiments of the present disclosure are directed towards a system and method for identifying call status in real-time using classification of audio messages.

An objective of the present disclosure is directed towards a system equipped to know various scenarios for call attempt, where the various scenarios comprise communication device switched off, communication device not reachable, communication device is busy, network issue in connecting, incoming is barred to the communication device, communication device was ringing or not, ringing duration, pre-ringing duration, and so forth.

Another objective of the present disclosure is directed towards a system to identify the mobile country code (MCC), mobile network code (MNC) of a mobile station international subscriber directory number which is used to uniquely identify a communication service operator network (carrier) using the GSM of the number by computing the same using an audio message received from the mobile network operator.

According to an exemplary aspect, the system comprises a first communication device, and a second communication device communicated through a communication service operator network.

According to another exemplary aspect, the first communication device, the second communication device, and a machine learning device comprising a classifier module configured to analyze audio files based on the pre-defined labelled set using signal processing audio classification and machine learning techniques.

According to another exemplary aspect, the classifier module configured to split the audio files into chunks on the first communication device, the second communication device, and the machine learning device in real-time.

According to another exemplary aspect, the classifier module configured to extract the audio features from the audio files.

According to another exemplary aspect, the classifier module configured to create a linear support vector classification model and train the linear support vector classification model using the audio files.

According to another exemplary aspect, the classifier module configured to remove invalid states from the audio files and give a final state of the call status reason by applying state machine rules on the first communication device, the second communication device, and the machine learning device.

DETAILED DESCRIPTION OF EXAMPLE EMBODIMENTS

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and so forth, herein do not denote any order, quantity, or importance, but rather are used to distinguish one element from another.

Figure 1:
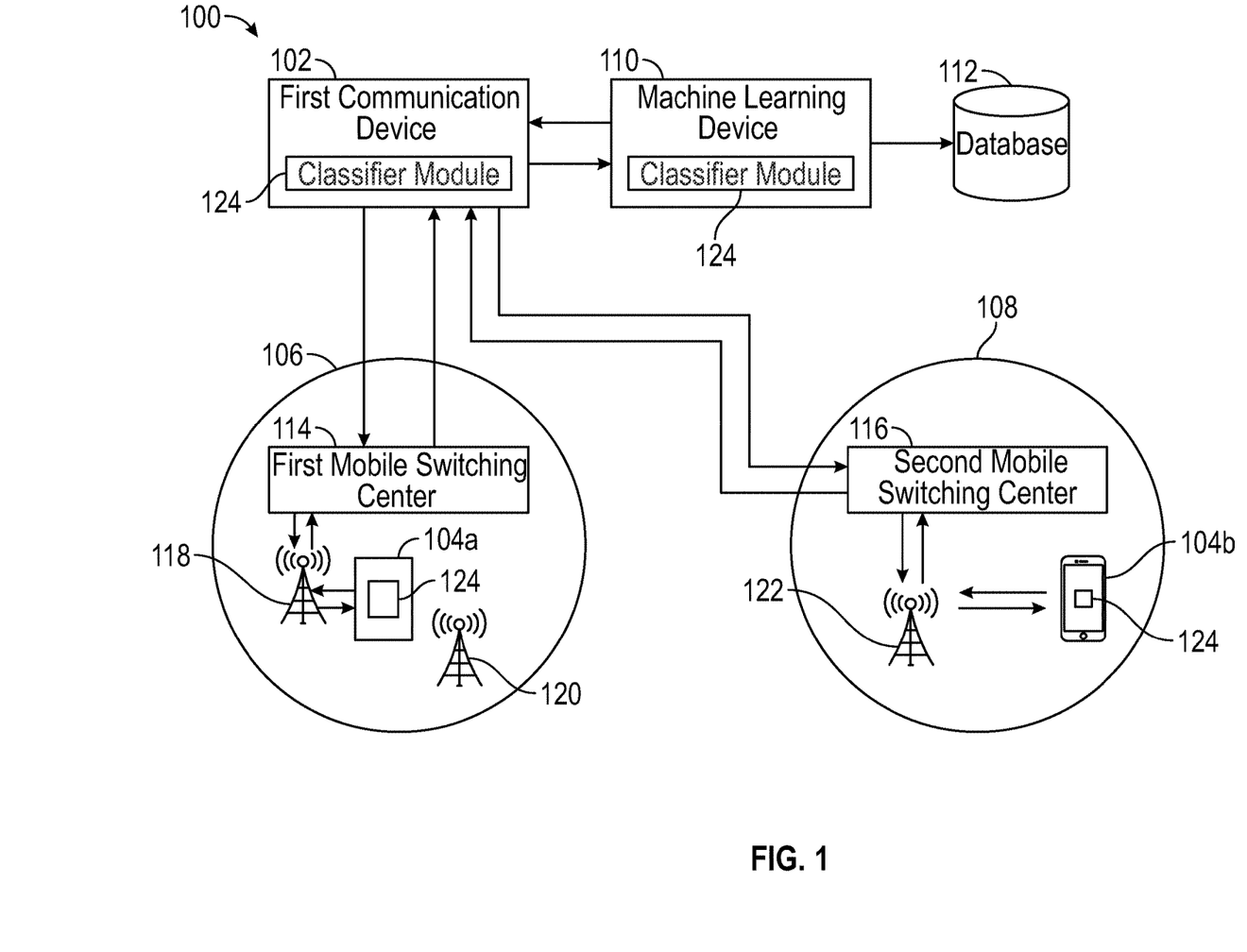
FIG. 1 is a block diagram depicting a schematic representation of system for identifying call status in real-time, in accordance with one or more exemplary embodiments.

Referring to FIG. 1 is a block diagram 100 depicting a schematic representation of system for identifying call status in real-time, in accordance with one or more exemplary embodiments. The system 100 includes a first communication device 102, a second communication device 104a, a third communication device 104b, a first communication service operator network 106, a second communication service operator network 108, a machine learning device 110, and a database 112. The first communication device 102, and the second communication device 104a, the third communication device 104b may be operatively coupled to each other through the first communication service operator network 106 and/or the second communication service operator network 108. The first communication service operator network 106 and/or the second communication service operator network 108 may include but not limited to, an Internet of things (IoT network devices), an Ethernet, a wireless local area network (WLAN), or a wide area network (WAN), a Bluetooth low energy network, a ZigBee network, a WIFI communication network e.g., the wireless high speed internet, or a combination of networks, a cellular service such as a 4G (e.g., LTE, mobile WiMAX) or 5G cellular data service, a RFID module, a NFC module, wired cables, such as the world-wide-web based Internet, or other types of networks may include Transport Control Protocol/Internet Protocol (TCP/IP) or device addresses (e.g. network-based MAC addresses, or those provided in a proprietary networking protocol, such as Modbus TCP, or by using appropriate data feeds to obtain data from various web services, including retrieving XML data from an HTTP address, then traversing the XML, for a particular node) and so forth without limiting the scope of the present disclosure. The first communication device 102, and the second communication device 104a, the third communication device 104b may be a machine learning device. The machine learning device 110 may be based on any suitable machine learning technique that may be used to classify audio messages. The audio messages may include audio files.

Although the communication devices 102, 104a, 104b are shown in FIG. 1, an embodiment of the system 100 may support any number of communication devices. The communication devices 102, 104a, 104b may include, but not limited to, a personal mobile computing device such as a tablet computer, a laptop computer, or a netbook computer, a smartphone, a land phone, a video game device, a digital media player, a piece of home entertainment equipment, backend servers hosting database and other software, and the like. Each communication device supported by the system 100 is realized as a computer-implemented or computer-based device having the hardware or firmware, software, and/or processing logic needed to carry out the intelligent messaging techniques and computer-implemented methodologies described in more detail herein. The first communication service operator network 106 and/or the second communication service operator network 108 include a first mobile switching center 114, a second mobile switching center 116, a first tower 118, and a second tower 120, and a third tower 122. The first communication service operator network 106 and/or the second communication service operator network 108 may include a calling party operator network. The first communication service operator network 106 and/or the second communication service operator network 108 may include, but not limited to, landline telephone operator network, an internet telephone operator network, a mobile telephone operator network, and so forth.

The first communication device 102, and the second communication device 104a, the third communication device 104b, the machine learning device 110 includes a classifier module 124, which is accessed as mobile applications, web applications, software that offers the functionality of accessing mobile applications, and viewing/processing of interactive pages, for example, are implemented in the communication devices 102, 104a, 104b as will be apparent to one skilled in the relevant arts by reading the disclosure provided herein. The classifier module 124 may be downloaded from the cloud server (not shown). For example, the classifier module 124 may be any suitable applications downloaded from, GOOGLE PLAY® (for Google Android devices), Apple Inc.'s APP STORE® (for Apple devices, or any other suitable database). In some embodiments, the classifier module 124 may be software, firmware, or hardware that is integrated into the communication devices 102, 104a, and 104b. The classifier module 124 may be an artificial intelligence powered, needs-based, social networking service to provide the call status to users. The users may include, but not limited to, callers, clients, service providers, and so forth. The first communication device 102 may include a first telephone number E1, and the second communication device 104a includes a second telephone number N2, and the third communication device 104b includes a third telephone number N3.

When a third telephone number N3 of the third communication device 104b is dialed from the second communication device 104a, request may be sent to the first mobile switching center 114. The classifier module 124 may be configured to initiate recording the audio message after sending the request from the second communication device 104a to the first mobile switching center 114. The first mobile switching center 114 may be configured to forward the request to the second mobile switching center 116 via the first communication device 102. Where the second mobile switching center 116 may belong to the third communication device 104b. The second mobile switching center 116 may be configured to forward the request to the nearby tower 122 and/or nearby mobile switching center in case of landline. A request may be forwarded to the third communication device 104b from the second mobile switching center 116. The third communication device 104b may either pick up the call or not. Whatever the action devices take, response may be sent back to nearby the mobile switching center/tower. The tower/mobile switching center may be configured to send the response back to the second mobile switching center 116. The second mobile switching center 116 may be configured to send the response back to the first mobile switching center 114 via the first communication device 102, nearby tower118/120/mobile switching center. The classifier module 124 may be configured to stop the recording audio message after receiving the response from the first mobile switching center 114 to the first communication device 102. For example, a telephone call is made by N2 number from the second communication device 104a to the number N3 of the third communication device 104b and/or number E1 of the first communication device 102, then the first communication device 102 connects the telephone call to number N3 of the third communication device 104b. Similarly, the first communication device 102 can also dial out from the number E1 to the number N2/N3. The first communication device 102 is involved to act as an intermediate layer to communicate between the communication devices 104a, 104b through which audio stream of communication flows through. The classifier module 124 can listen to audio while making the telephone call.

The classifier module 124 may be configured to analyze the audio messages and derive the telephone call status and other metadata information. The classifier module 124 may be configured to classify the audio messages based on the pre-defined labelled set using signal processing and machine learning techniques. The pre-defined labeled set may be a collection of telephony audio samples categorized into appropriate classes to help the classifier module 124 to differentiate between the various categories. The pre-defined labeled set may also be called as the training data set and is usually a baseline for all machine learning models and may be obtained from involving a combination of manual and automated approach. The classifier module 124 may also be configured to identify mobile country codes (MCC) and mobile network codes (MNC) of the communication device 104a 104b using the audio message that is getting played. This may be done by recognizing the language of the first message that is getting played because every communication service operator network 106/108 in a circle may play the local language audio first followed by other languages. Also, every communication service operator network 106/108 includes unique audio message for every circle for every type of message. The classifier module 124 may be configured to collect all the sample data for each class of audio message using signal processing and machine learning techniques. The classifier module 124 may also be configured to train the machine learning device 110 for the new set of inputs. The database 112 may be configured to store the signal processing and machine learning techniques. The signal processing may be a precursor to the machine learning model which is responsible for audio classification wherein the input audio signals need to be analyzed for dead phases (silence/no meaningful audio) or pick up certain frequency patterns and then decide upon whether to send these audio signals to the machine learning model. The machine learning techniques involve certain pre-defined mathematical/statistical rules based on which a machine is able to draw boundaries between different categories based on a pre-defined labeled set in the case of a classification problem.

Figure 2:
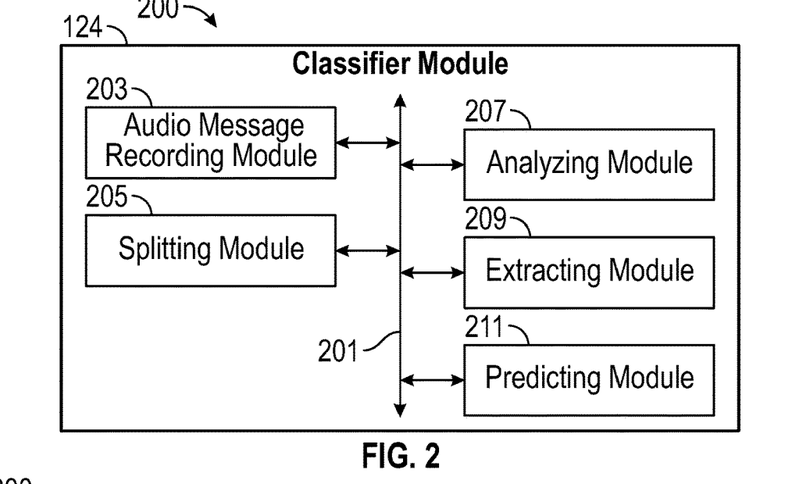
FIG. 2 is a block diagram depicting the classifier module 124 shown in FIG. 1, in accordance with one or more exemplary embodiments.

Referring to FIG. 2 is a block diagram 200 depicting the classifier module 124 shown in FIG. 1, in accordance with one or more exemplary embodiments. The classifier module 124 may include a bus 201, an audio message recording module 203, and a splitting module 205, an analyzing module 207, an extracting module 209, and a predicting module 211. The bus 201 may include a path that permits communication among the modules of the classifier module 124. The term "module" is used broadly herein and refers generally to a program resident in the memory of the machine learning device 110.

A telephony call may be initiated via the machine learning device 110 with recording enabled during dial by the audio message recording module 203. The audio message recording module 203 may be configured to start recording the audio message once the telephony call is initiated and stop the recording after receiving response from the first mobile switching center 114 and/or the second mobile switching center 116. The audio message recording module 203 may send the recorded audio files to the splitting module 205. The audio files may include, an audio, but not limited to, not reachable, beep/engaged, ringing, switched off, busy, waiting, invalid number, incoming barred, outgoing barred, call divert, and so forth.

The analyzing module 207 may be configured to analyze the recorded audio files and the splitting module 205 may be configured to split the recorded audio files into multiple chunks by detecting silence based on the pre-defined labelled set using signal processing audio classification and machine learning techniques. For every chunk, the extracting module 209 may be configured to extract audio features like discrete Fourier transform, Mel frequency cepstral coefficient and short-term Fourier transform from the audio files. The extracting module 209 may also be configured to create a linear support vector classification model and train the linear support vector classification model using the audio files. The linear support vector classification model is the machine learning technique. The linear support vector classification model may be an optimized version of support vector machine (SVM). The linear support vector classification model may be implemented in terms of LIBLINEAR whereas the underlying support vector machine model is implemented in terms of LIBSVM. The implementation of linear support vector machine model gives it the advantage of performing better on both dense and sparse input space, flexibility in choice of penalties, better scalability for large numbers of samples and a better multi-class classification performance by implementing the one-vs-rest scheme. The dense input may be the closely associated feature vectors and sparse input may be the feature vectors. The predicting module 211 may be configured to remove invalid states and give final state of the call status reason (for example, failure reason) by applying state machine rules. The predicting module 211 may be configured to give the type of message for every chunk.

Figure 3:
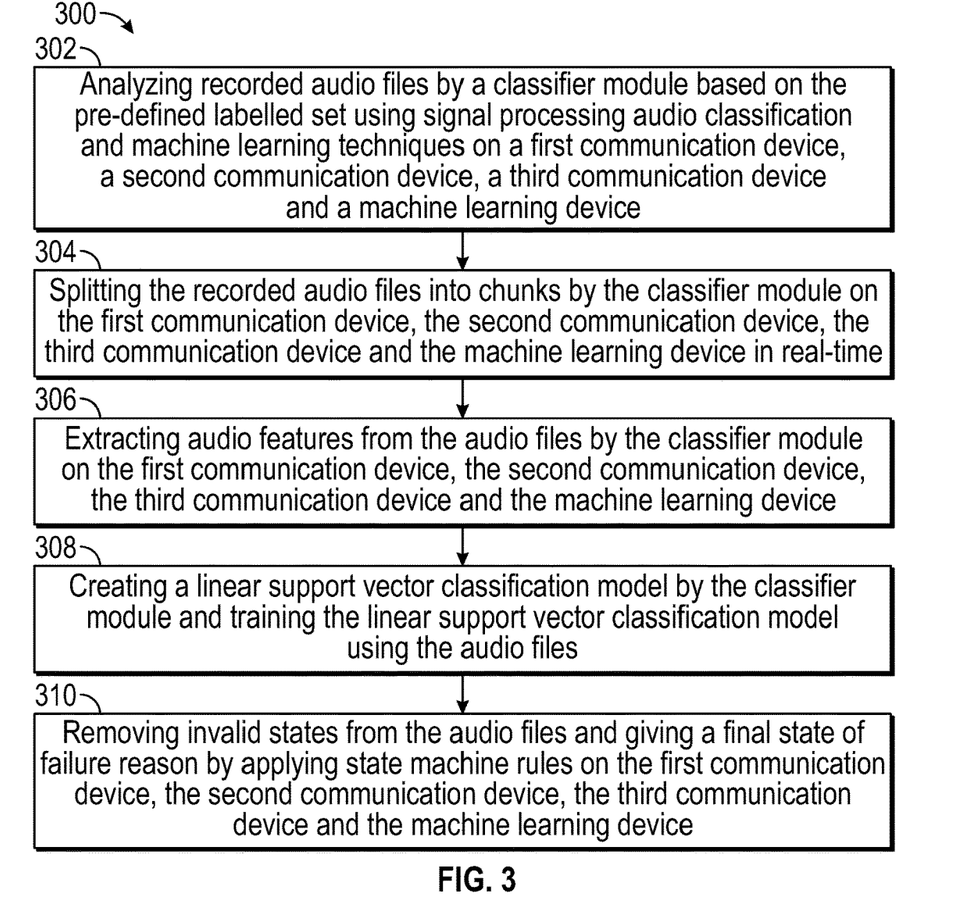
FIG. 3 is a flowchart depicting an exemplary method for identifying call status in real-time, in accordance with one or more exemplary embodiments.

Referring to FIG. 3 is a flowchart 300 depicting an exemplary method for identifying call status in real-time, in accordance with one or more exemplary embodiments. As an option, the method 300 is carried out in the context of the details of FIG. 1, and FIG. 2. However, the method 300 is carried out in any desired environment. Further, the aforementioned definitions are equally applied to the description below.

The method commences at step 302, the classifier module analyzes the recorded audio files based on the pre-defined labelled set using signal processing audio classification and machine learning techniques on the first communication device, the second communication device, the third communication device and the machine learning device. Thereafter, at step 304, the classifier module splits the recorded audio files into chunks on the first communication device, the second communication device, the third communication device and the machine learning device in real-time. Thereafter, at step 306, the classifier module extracts the audio features from the audio files. Here, the audio features may include, but not limited to, discrete Fourier transform, Mel frequency cepstral coefficient and short-term Fourier transform, and so forth. Thereafter, at step 308, the classifier module creates the linear support vector classification model and trains the linear support vector classification model using the audio files. Thereafter, at step 310, the classifier module removes invalid states from the audio files and gives a final state of final state of the call status reason (for example, failure reason) by applying state machine rules on the first communication device, the second communication device, the third communication device, and the machine learning device.

Figure 4:
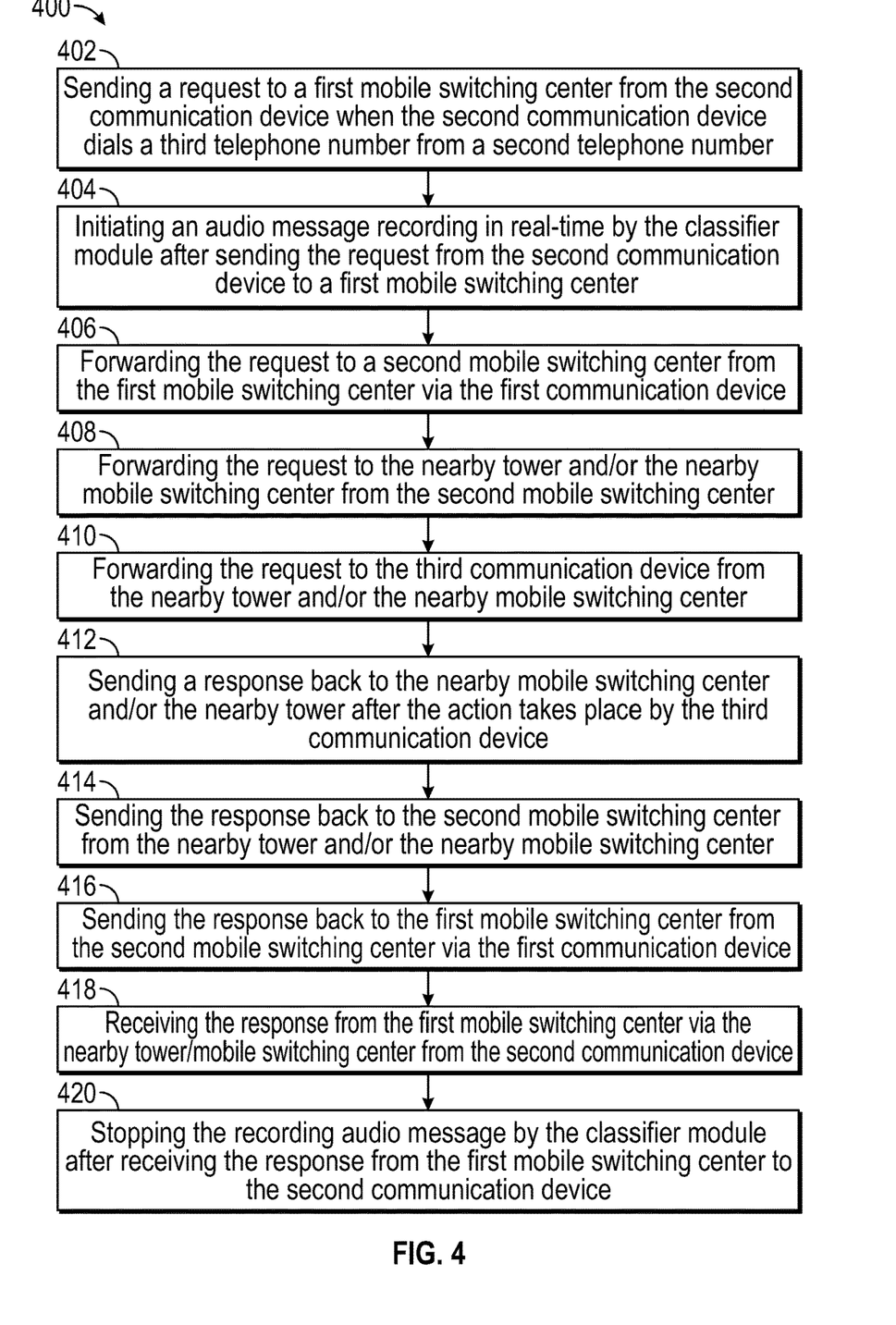
FIG. 4 is a flowchart depicting an exemplary method for recording audio files, in accordance with one or more exemplary embodiments.

Referring to FIG. 4 is a flowchart 400 depicting an exemplary method for recording audio files, in accordance with one or more exemplary embodiments. As an option, the method 400 is carried out in the context of the details of FIG. 1, FIG. 2, and FIG. 3. However, the method 400 is carried out in any desired environment. Further, the aforementioned definitions are equally applied to the description below.

At step 402, the second communication device sends the request to the first mobile switching center when the second communication device dials the third telephone number from the second telephone number. Thereafter, at step 404, the classifier module initiates recording the audio message in real-time after sending the request from the second communication device to the first mobile switching center. Thereafter, at step 406, the first mobile switching center forwards the request to the second mobile switching center via the first communication device. Thereafter, at step 408, the second mobile switching center forwards the request to the nearby tower and/or the nearby mobile switching center. Thereafter, at step 410, the nearby tower and/or the nearby mobile switching center forwards the request to the third communication device.

Thereafter, at step 412, response may be sent back to the nearby mobile switching center and/or the nearby tower after the action takes place by the third communication device. Thereafter, at step 414, the nearby tower and/or the nearby mobile switching center sends the response back to the second mobile switching center. Thereafter, at step 416, the second mobile switching center sends the response back to the first mobile switching center via the first communication device. Thereafter, at step 418, the second communication device receives response from the first mobile switching center via the nearby tower/mobile switching center, and the first communication device. Thereafter, at step 420, the classifier module stops the recording audio message after receiving the response from the first mobile switching center to the second communication device.

Figure 5:
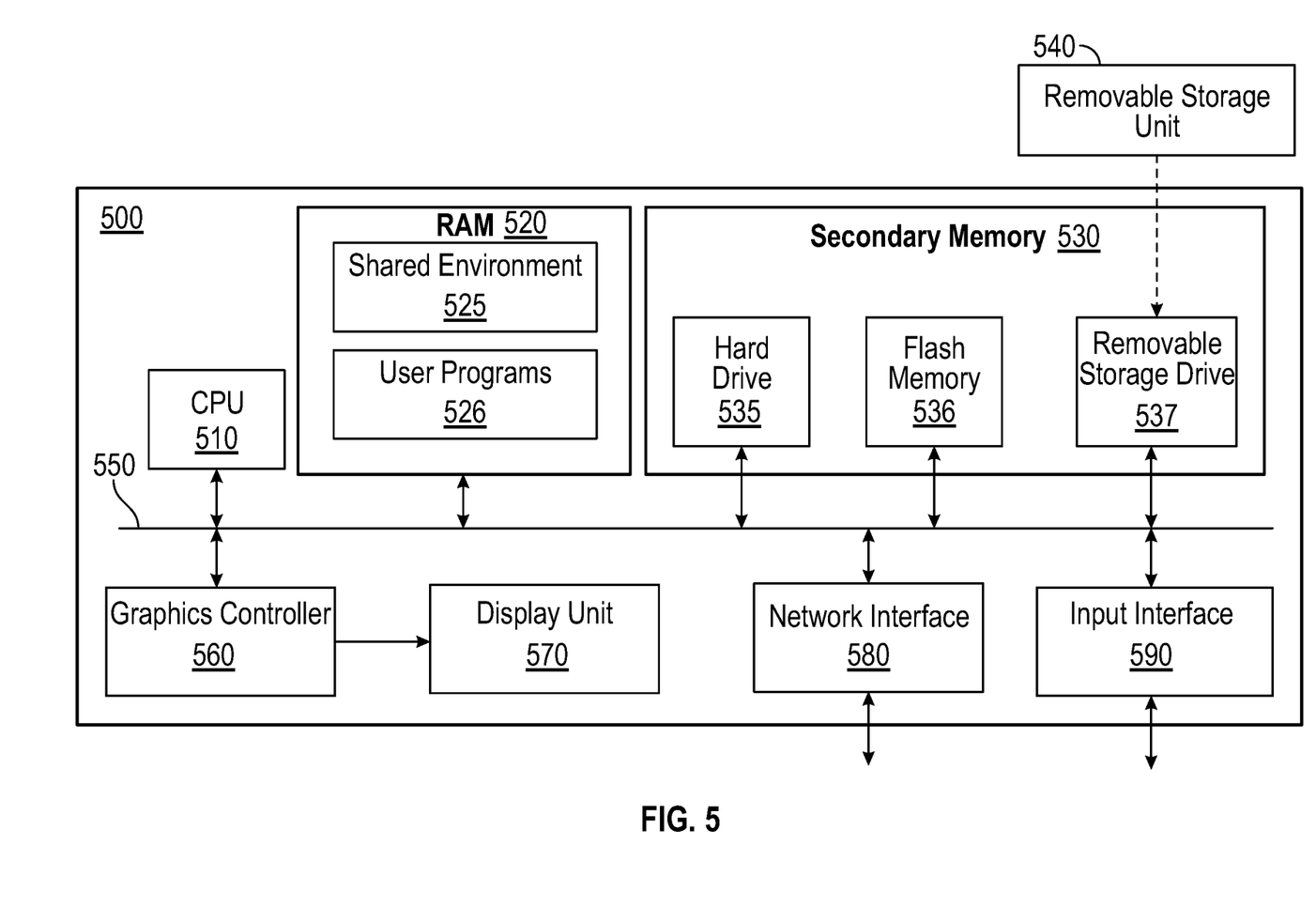
FIG. 5 is a block diagram illustrating the details of a digital processing system in which various aspects of the present disclosure are operative by execution of appropriate software instructions.

Referring to FIG. 5 is a block diagram 500 illustrating the details of a digital processing system 500 in which various aspects of the present disclosure are operative by execution of appropriate software instructions. The Digital processing system 500 may correspond to the communication devices 102, 104a, 104b (or any other system in which the various features disclosed above can be implemented).

Digital processing system 500 may contain one or more processors such as a central processing unit (CPU) 510, random access memory (RAM) 520, secondary memory 527, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present disclosure. CPU 510 may contain multiple processing units, with each processing unit potentially being designed for a specific task. Alternatively, CPU 510 may contain only a single general-purpose processing unit.

RAM 520 may receive instructions from secondary memory 530 using communication path 550. RAM 520 is shown currently containing software instructions, such as those used in threads and stacks, constituting shared environment 525 and/or user programs 526. Shared environment 525 includes operating systems, device drivers, virtual machines, etc., which provide a (common) run time environment for execution of user programs 526.

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse) and may be used to provide inputs. Network interface 580 provides connectivity to a network (e.g., using Internet Protocol), and may be used to communicate with other systems (such as those shown in FIG. 1) connected to the communication service operator network 106/108.

Secondary memory 530 may contain hard drive 535, flash memory 536, and removable storage drive 537. Secondary memory 530 may store the data software instructions (e.g., for performing the actions noted above with respect to the Figures), which enable digital processing system 500 to provide several features in accordance with the present disclosure.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EEPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 530. Volatile media includes dynamic memory, such as RAM 520. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus (communication path) 550. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub-combinations of the various features described hereinabove as well as variations and modifications thereof, which would occur to persons skilled in the art upon reading the foregoing description.

What is claimed is:

1. A system is configured to identify a call status in real-time, comprising:
   a first communication device and a second communication device are communicated through a first communication service operator network and a second communication service operator network, whereby the first communication service operator network and the second communication service operator network comprise a first mobile switching center, a second mobile switching center, and one or more towers;
   the first communication device comprises a first contact phone number configured to make one or more phone calls to a second contact phone number of the second communication device through the first mobile switching center and the one or more towers, whereby the second contact phone number of the second communication device is configured to receive the one or more phone calls through the second switching center and the one or more towers; and
   a classifier module is configured to record one or more audio messages in real-time on the first communication device after making the one or more phone calls from the first contact phone number of the first communication device to the second contact phone number of the second communication device, the classifier module is configured to analyze one or more recorded audio messages on a machine learning device and split the one or more recorded audio messages into a plurality of chunks by detecting silence based on a plurality of telephony audio samples using signal processing and machine learning techniques; the classifier module is configured to extract one or more audio features from the one or more audio messages and remove a plurality of invalid states from the plurality of chunks to derive at least one call status reason in real-time by applying a plurality of machine rules.

2. The system of claim 1, wherein the classifier module is configured to identify a plurality of mobile country codes and a plurality of mobile network codes using the one or more audio messages on the first communication device.

3. The system of claim 1, wherein the classifier module is configured to send recorded one or more audio messages to the machine learning device which analyzes the recorded one or more audio messages from the first communication device based on the plurality of telephony audio samples using signal processing and machine learning techniques.

4. The system of claim 1, wherein the classifier module is configured to stop recording the one or more audio messages on the first communication device after receiving at least one response from at least one of: the first switching center; and the second switching center.

5. The system of claim 1, wherein the classifier module comprises an audio message recording module configured to record the one or more audio messages once the one or more telephony calls are initiated and stop the recording of the one or more audio messages after receiving the at least one response from at least one of: the first mobile switching center; and the second mobile switching center.

6. The system of claim 1, wherein the classifier module comprises an analyzing module configured to analyze the one or more recorded audio messages.

7. The system of claim 1, wherein the classifier module comprises a splitting module configured to split the one or more audio messages into the plurality of chunks by detecting silence based on the plurality of telephony audio samples.

8. The system of claim 1, wherein the classifier module comprises an extracting module configured to create a linear support vector classification model and train the linear support vector classification model on the machine learning device using the one or more audio messages.

9. The system of claim 1, wherein the classifier module comprises a predicting module configured to remove the plurality of invalid states and give at least one call failure reason by applying the plurality of machine rules on the machine learning device.

10. A method for identifying call status in real-time, comprising:
- a first communication device and a second communication device are communicated through a first communication service operator network and a second communication service operator network, the first communication device comprises a first contact phone number configured to make one or more phone calls to a second contact phone number of the second communication device through a first mobile switching center and one or more towers, whereby the second contact phone number of the second communication device is configured to receive the one or more phone calls through the second switching center and the one or more towers;
- recording one or more audio messages in real-time by a classifier module after making the one or more phone calls from a first contact phone number of the first communication device to a second contact phone number of the second communication device;
- sending recorded one or more audio messages to a machine learning device which analyzes the recorded one or more audio messages based on a plurality of telephony audio samples using signal processing and machine learning techniques;
- splitting the one or more audio messages into a plurality of chunks in real-time by the classifier module on the machine learning device;
- extracting a plurality of audio features from the one or more audio messages by the classifier module on the machine learning device; and
- removing a plurality of invalid states from the one or more audio messages and deriving at least one call status reason in real-time by applying a plurality of machine rules on the machine learning device.

11. The method of claim 10, further comprising a step of stopping the recording one or more audio messages by the classifier module after receiving at least one response from at least one of: a first mobile switching center and a second mobile switching center to the first communication device.

12. The method of claim 10, further comprising a step of creating a linear support vector classification model and training the linear support vector classification model on the machine learning device using the one or more audio messages.

13. The method of claim 10, further comprising a step of sending one or more requests to the first mobile switching center from the first communication device when the first communication device makes the one or more phone calls from the first contact phone number to the second contact phone number of the second communication device.

14. The method of claim 10, further comprising a step of storing the signal processing and machine learning techniques in a database.

15. The method of claim 10, further comprising a step of collecting the plurality of telephony audio samples from the database and training the machine learning device by the classifier module for a plurality of inputs from the first communication device.

16. A computer program product comprising a non-transitory computer-readable medium having a computer-readable program code embodied therein to be executed by one or more processors, said program code including instructions to:
- a first communication device and a second communication device are communicated through a first communication service operator network and a second communication service operator network, the first communication device comprises a first contact phone number configured to make one or more phone calls to a second contact phone number of the second communication device through a first mobile switching center and one or more towers, whereby the second contact phone number of the second communication device is configured to receive the one or more phone calls through the second switching center and the one or more towers;
- record one or more audio messages in real-time by a classifier module after making one or more phone calls from a first contact phone number of the first communication device to a second contact phone number of the second communication device;
- send recorded one or more audio messages to a machine learning device which analyzes the recorded one or more audio messages based on a plurality of telephony audio samples using signal processing and machine learning techniques;
- split the one or more audio messages into a plurality of chunks in real-time by the classifier module on the machine learning device;
- extract a plurality of audio features from the one or more audio messages by the classifier module on the machine learning device; and
- remove a plurality of invalid states from the one or more audio messages and derive at least one call status reason in real-time by applying a plurality of machine rules on the machine learning device.

* * * * *